(12) United States Patent
Craig et al.

(10) Patent No.: US 7,510,352 B2
(45) Date of Patent: Mar. 31, 2009

(54) INTEGRAL CUTTING INSERT CLAMPING MECHANISM

(75) Inventors: Karen A. Craig, Greensburg, PA (US); Thomas J. Long, II, Greensburg, PA (US); Larry R. Meenan, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/890,155

(22) Filed: Aug. 3, 2007

(65) Prior Publication Data

US 2009/0035074 A1    Feb. 5, 2009

(51) Int. Cl.
B23B 27/16    (2006.01)

(52) U.S. Cl. .................... 407/107; 407/113; 407/104

(58) Field of Classification Search .............. 407/46, 407/47, 66, 99, 100–104, 113, 115, 117; B23B 27/16
See application file for complete search history.

(56) References Cited

U.S. PATENT DOCUMENTS

| 1,926,531 | A | * | 9/1933  | Graham ................. 407/77 |
| 2,173,772 | A |   | 9/1939  | Timmons |
| 2,799,079 | A |   | 7/1957  | Brigner, Jr. |
| 2,860,402 | A |   | 11/1958 | Proska |
| 2,870,523 | A | * | 1/1959  | Richard ................. 407/6 |
| 2,887,760 | A |   | 5/1959  | Armstrong |
| 2,992,472 | A |   | 7/1961  | Paul |
| 3,028,657 | A |   | 4/1962  | Almen |
| 3,144,795 | A |   | 8/1964  | Bunnell |
| 3,191,262 | A |   | 6/1965  | Gustafson |
| 3,268,978 | A | * | 8/1966  | Reck .................... 407/5 |
| 3,518,737 | A |   | 7/1970  | Hood |
| 3,808,655 | A | * | 5/1974  | Foster .................. 407/73 |
| 3,887,974 | A | * | 6/1975  | Sorice .................. 407/113 |
| 4,277,206 | A |   | 7/1981  | Hilton |
| 4,400,116 | A |   | 8/1983  | Buchmann et al. |
| 4,400,117 | A | * | 8/1983  | Smith ................... 407/49 |
| 4,744,703 | A | * | 5/1988  | Cochran ................ 407/45 |
| 5,033,916 | A | * | 7/1991  | Dunklau ................ 407/33 |
| 5,167,473 | A | * | 12/1992 | Barnett ................. 407/104 |
| 5,529,440 | A |   | 6/1996  | Schmidt |
| 5,704,734 | A |   | 1/1998  | Ashley et al. |
| 5,820,311 | A | * | 10/1998 | Grun et al. ............ 407/102 |
| 5,836,723 | A | * | 11/1998 | Von Haas et al. ........ 407/107 |
| 6,000,885 | A | * | 12/1999 | Erickson ............... 407/113 |
| 6,017,172 | A | * | 1/2000  | Ukegawa et al. ......... 407/113 |
| 6,170,368 | B1|   | 1/2001  | Oles et al. |

(Continued)

FOREIGN PATENT DOCUMENTS

JP    09262706 A  * 10/1997

(Continued)

Primary Examiner—Boyer D Ashley
Assistant Examiner—Sara Addisu
(74) Attorney, Agent, or Firm—Matthew W. Gordon (57) ABSTRACT

An integral insert clamping mechanism for transferring clamping forces away from the screw hole of the insert to relieve stress at the screw hole by way of protrusions located on the bottom surface of the clamp plate. The clamping mechanism functions by a clamp plate being seated within an indentation on the top surface of the insert and a screw inserted into screw holes of the clamp plate and the insert and then threadably engaged with a threaded bore of a milling cutter. The top surfaces of the screw, the insert and the clamp plate being substantially coplanar. In an alternative embodiment, the clamp plate having a chip breaker.

12 Claims, 5 Drawing Sheets

U.S. PATENT DOCUMENTS

| | | | | |
|---|---|---|---|---|
| 6,196,774 B1 | * | 3/2001 | Minshall | 408/233 |
| 6,682,273 B2 | * | 1/2004 | Sjoo et al. | 407/105 |
| 6,951,313 B2 | * | 10/2005 | Frick et al. | 241/92 |
| 7,073,986 B2 | * | 7/2006 | Andras | 407/113 |
| 7,313,991 B2 | * | 1/2008 | Penkert | 82/1.11 |
| 7,320,563 B2 | * | 1/2008 | Muller et al. | 407/113 |
| 2005/0186039 A1 | * | 8/2005 | Muller et al. | 407/113 |
| 2006/0018723 A1 | * | 1/2006 | Sjoo et al. | 407/102 |
| 2006/0147281 A1 | | 7/2006 | Nagaya et al. | |
| 2007/0245535 A1 | * | 10/2007 | Noggle | 29/428 |

FOREIGN PATENT DOCUMENTS

| | | | | |
|---|---|---|---|---|
| JP | 2000280106 A | * | 10/2000 |
| JP | 2004122262 A | * | 4/2004 |

* cited by examiner

INTEGRAL CUTTING INSERT CLAMPING MECHANISM

BACKGROUND OF THE INVENTION

1. Field of Invention

The invention is directed towards an integral cutting insert clamping mechanism. More particularly, a mechanism for clamping a cutting insert onto a milling cutter during metalworking operations.

2. Description of Related Art

A number of different types of devices have been used in the past for securing cutting inserts to milling cutters to permit replacement when the cutting insert becomes worn. Many insert clamping mechanisms are directed to a screw being inserted through a screw hole in the cutting insert and threadably engaged into a milling cutter, such as U.S. Pat. No. 5,129,767. However, this clamping arrangement is not suitable for many cutting inserts, especially larger cutting inserts over a half-inch in length and/or cutting inserts whose length is at least twice the width.

The cutting insert is susceptible to breakage at the screw hole because of stress localized near the screw hole. First, during metalworking operations, the forces exerted on the cutting insert from the work piece cause the cutting insert to act as a lever and the screw hole, where the insert is attached to the milling cutter, to act as a fulcrum. The longer the cutting insert the more force which is applied at the location of the screw hole and subsequently increased stress at the screw hole. Second, the screw hole, in of itself, causes stress risers around the screw hole. Third, a downward clamping force by the screw onto the insert adds stress at the location of the screw hole. The localization of stresses, due to applied forces from metalworking and clamping of the cutting insert, at the screw hole causes the cutting insert to be susceptible to breakage at the screw hole.

The weight of a cutting insert is an important factor in metal working. First, during milling it is advantageous to increase revolution per minute (RPM) of the milling cutter to decrease the time to manufacture a work piece. One way to increase the RPM of the milling cutter is to decrease the weight of the cutting insert. If the volume of the cutting insert is decreased so is the weight of the cutting insert and subsequently the higher RPM of the milling cutter. Second, it is advantageous to decrease the cost of the cutting insert. If the volume of the insert is decreased, so is the amount of material to make the insert. The less material that is used to make the insert and subsequently the lower the weight of the cutting insert, the lower the cost of the insert.

Therefore, an object of the present invention is to provide an integral cutting insert clamping mechanism. Further objects of the invention are to provide an integral cutting insert clamping mechanism that: disperses the clamping forces evenly away from the screw hole of the insert to reduce the stress at the screw hole and thereby reduce the susceptibility of breakage at the screw hole, has a substantially planar top surface to reduce the chip evacuation interference on the rake face of the cutting insert, and has a chip breaker.

SUMMARY OF THE INVENTION

An integral cutting insert clamping mechanism including a cutting insert with a top surface, a bottom surface, a plurality of side surfaces and an indentation in the top surface. At least one cutting edge of the insert defined at an intersection between the top surface and one of the side surfaces. The insert having an axial bore extending between the bottom and top surfaces. A clamp plate seated within the indentation comprising a top surface, bottom surface, a plurality of side surfaces and an axial bore extending between the bottom and top surfaces of the clamp plate. The mechanism further comprising a retaining screw, wherein the retaining screw is inserted into the cutting insert bore and the clamp bore and secured to a milling cutter to create a clamping force on the insert.

An integral cutting insert clamping mechanism including a cutting insert with a top surface, a bottom surface and a plurality of side surfaces. At least one cutting edge of the insert defined at an intersection between the top surface and one of the side surfaces. The insert including an axial bore extending between the bottom and top surfaces. The insert including an indentation in the top surface and the mechanism including a clamping means for applying a clamping force substantially evenly away from the axial bore of the insert.

An integral cutting insert clamping mechanism including a cutting insert having a top surface, a bottom surface and a plurality of side surfaces, at least one cutting edge defined at an intersection between the top surface and one of the side surfaces, an axial bore extending between the bottom and top surfaces and an indentation in the top surface, the indentation having a bottom surface and a plurality of side walls and the transferring of a clamping force substantially evenly away from the insert axial bore.

An integral cutting insert clamping mechanism including a cutting insert having a top surface, a bottom surface and a plurality of side surfaces, at least one cutting edge defined at an intersection between the top surface and one of the side surfaces, and an indentation in the top surface; and mechanism including a clamp plate having a top surface, bottom surface, at least one side surface, and the clamp plate seated within the indentation of the cutting insert.

An integral cutting insert clamping mechanism including a cutting insert having a top surface, a bottom surface and a plurality of side surfaces, at least one cutting edge defined at an intersection between the top surface and one of the side surfaces, and an indentation in the top surface. The mechanism further including a clamp plate having a top surface, bottom surface, at least one side surface and seated within the indentation of the cutting insert, wherein the cutting insert material is different than the clamp plate material.

BRIEF DESCRIPTION OF THE DRAWINGS

Further features of the present invention, as well as the advantages derived therefrom, will become clear from the following detailed description made with reference to the drawings which.

DESCRIPTION OF THE INVENTION

In the following description, like reference characters designate like or corresponding parts. Also, in the following description it is to be understood that such terms as "top" and "bottom" and the like are words of convenience employed for describing the positional relationship of the elemental parts of the present invention.

Figure 1:
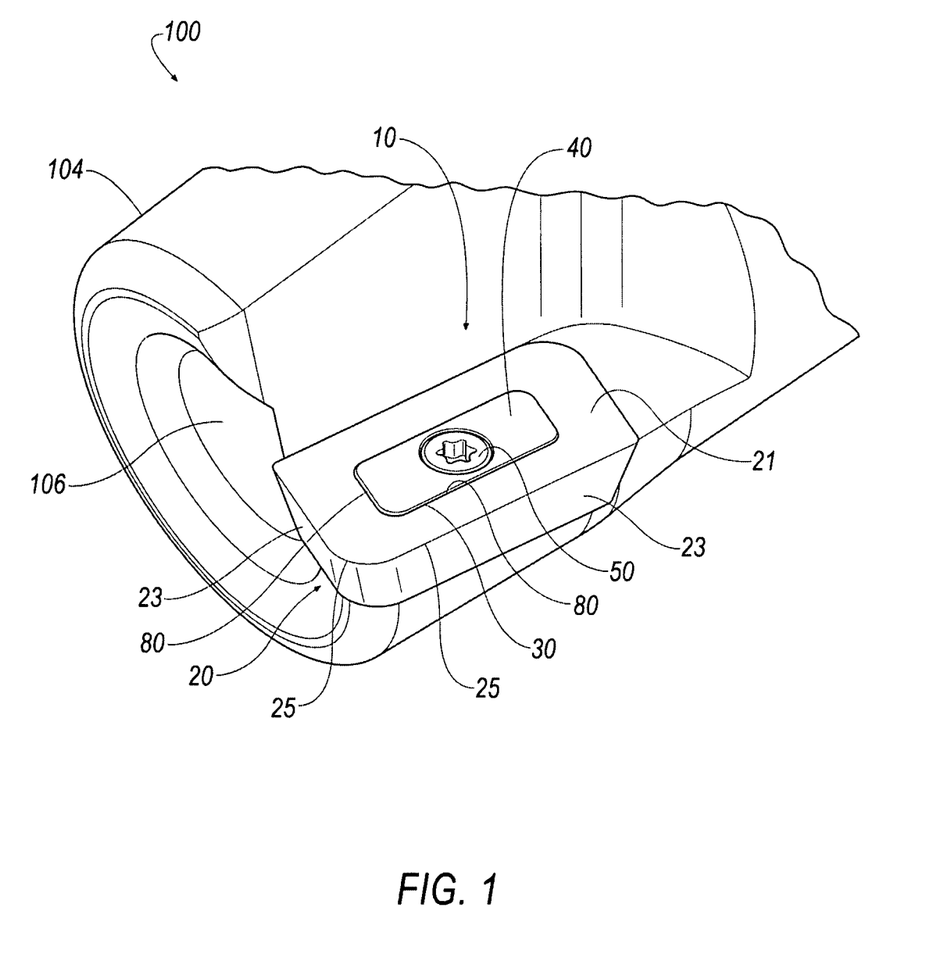
FIG. 1 is a perspective view of the assembled integral cutting insert clamping mechanism mounted on a milling cutter.

FIG. 1 shows the integral cutting insert clamping mechanism 10 mounted within a milling cutter 100 in accordance with the subject invention. In general, the clamping mechanism 10 includes a clamp plate 40 seated within an indentation 30 of a cutting insert 20 and a retaining screw 50 inserted within the clamp plate. The combination of the retaining screw 50 and the clamp plate 40 clamp the insert 20 to the milling cutter 100 when the retaining screw is engaged with the milling cutter.

The cutting insert 20 may be utilized for metalworking operations and includes a top surface 21, a bottom surface 22, side surfaces 23 and an axial bore 24 extending between the bottom surface and the top surface. The axial bore 24 is substantially centered with the top surface 21 of the insert 20. The cutting edges 25 of the insert 20 are defined by the intersection of the side surfaces 23 and the top surface 21.

Figure 2:
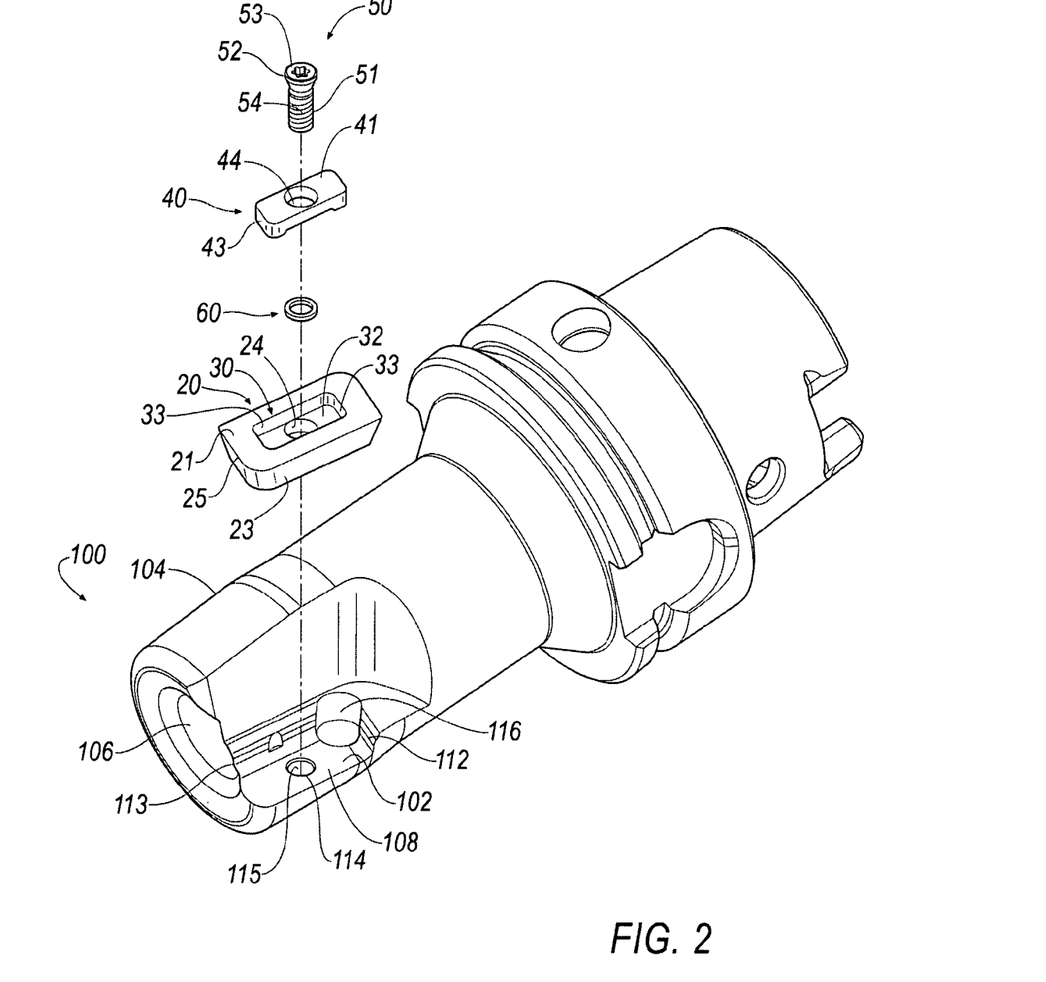
FIG. 2 is an exploded perspective view of one embodiment of the arrangement illustrated in FIG. 1.

As shown in FIG. 2, the cutting insert 20 has an indentation 30 substantially centered on the top surface 21 and with the axial bore 24 of the insert. The indentation 30 has a bottom surface 32 and side surfaces 33. The indentation 30 is for the seating of the clamp plate 40 within the indentation.

Figure 3A:
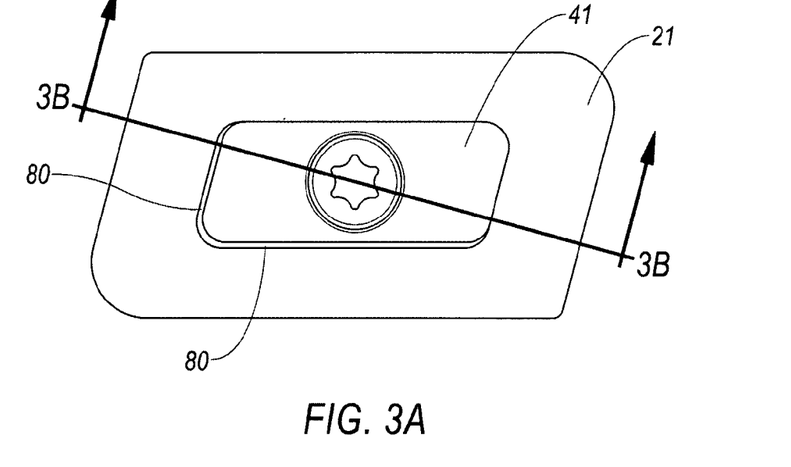
FIG. 3A is a top view of one embodiment of the integral insert clamping mechanism.
Figure 3B:
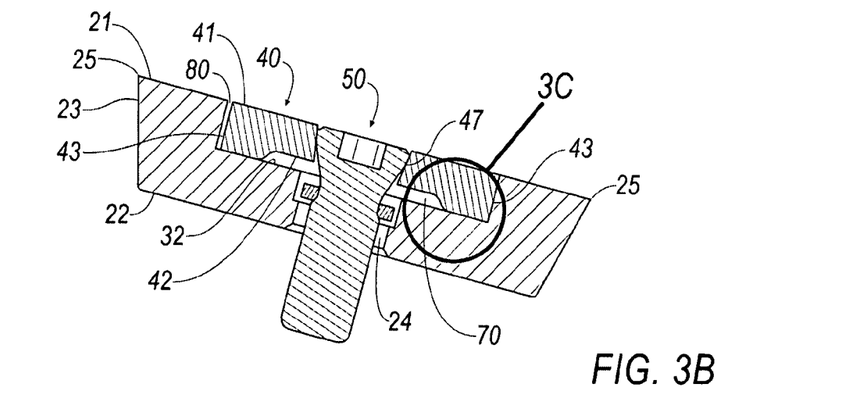
FIG. 3B is a cross sectional view along A-A of the of the integral clamping mechanism embodiment illustrated in FIG. 3A.
Figure 3C:
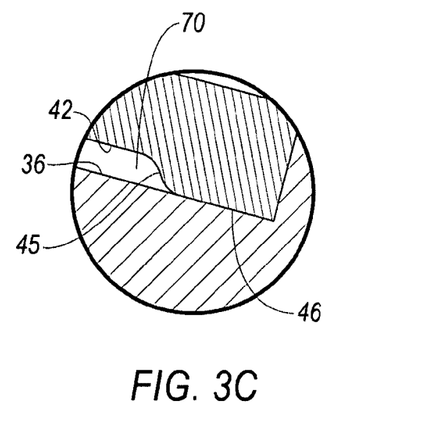
FIG. 3C is a close up of Section B of FIG. 3B.
Figure 3D:
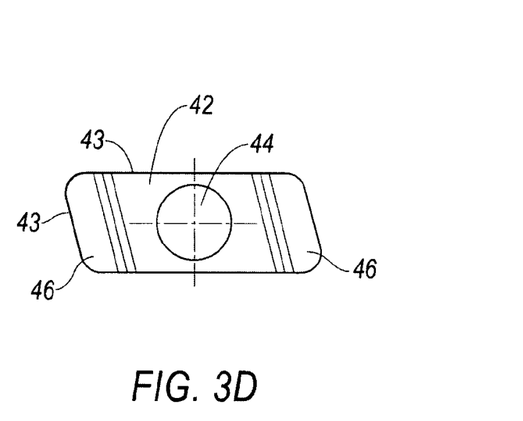
FIG. 3D is a bottom view of the clamp plate of the embodiment illustrated in FIG. 3A.

As shown in FIGS. 3A and 3B, the clamp plate 40 has a top surface 41, a bottom surface 42, side surfaces 43 and an axial bore 44. The axial bore 44 is substantially centered on the top surface 41 of the clamp plate. The intersection of the top surface 41 and the axial bore 44 is chamfered 47 for seating of a screw head 52 of the retaining screw 50, within the clamp plate 40. The retaining screw 50 also has an axial shaft 51 with radially extending threads 54 and a top surface 53 of the screw head 52.

The clamp plate 40 and the retaining screw 50 are connected together by a retaining clip 60 before the screw is placed within insert bore 24. The screw 50 is initially inserted into the bore 44 of the clamp plate 40 and the clip 60 is then placed around the shaft 51 between the threads 54 and the clamp plate thereby connecting the clamp plate to the retaining screw.

Figure 4A:
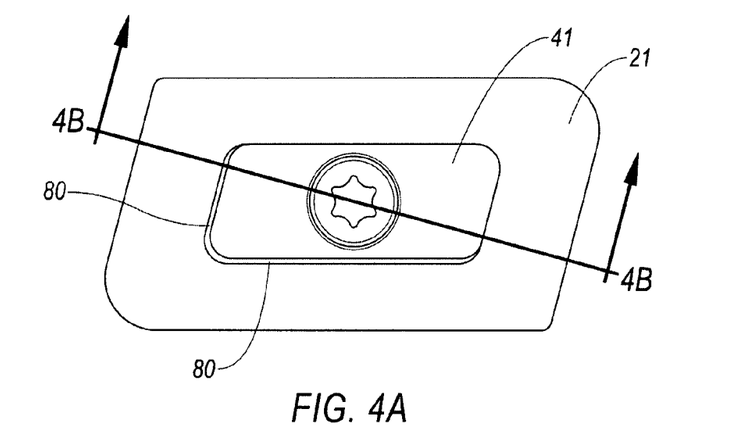
FIG. 4A is a top view of another embodiment of the integral insert clamping mechanism.
Figures 4B, 4C, 4D, 4E:
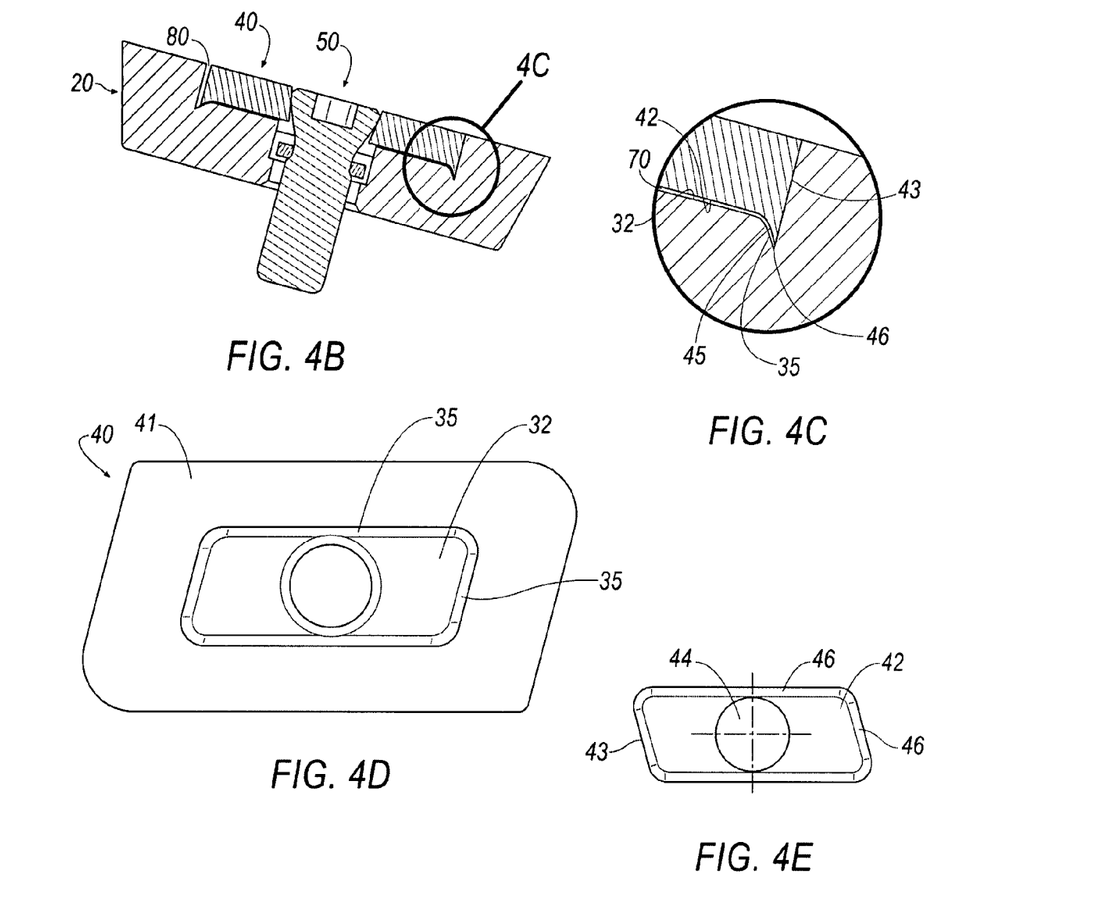
FIG. 4B is a cross sectional view along A-A of the of the integral clamping mechanism embodiment illustrated in FIG. 4A.
FIG. 4C is a close up of Section B of FIG. 4B.
FIG. 4D is a top view of the insert of the embodiment illustrated in FIG. 4A.
FIG. 4E is a bottom view of the clamp plate of the embodiment illustrated in FIG. 4A.

As shown in FIGS. 3B and 4B, the diameter of the axial bore 24 at the intersection with the bottom surface 22 is of a diameter to at least allow for clearance of the threaded shaft 51. The diameter of the axial bore 24 at the intersection with the bottom surface 32 of the indentation 30 is of a diameter to at least allow the seating of the clip 60.

The cutting insert 20 is not limited to a parallelogram shape, as shown, it may be appreciated that the cutting insert 20 may be of most any polygonal shape. Regardless of the shape of the insert 20, the shape of the top surface 41 of the clamp plate 40 substantially corresponds to the shape of the perimeter of the indentation 30. In a preferred embodiment, it may be appreciated that the shape of the indentation 30 substantially corresponds to the shape of the insert 20. It may be appreciated that the insert 20 is indexable and the retaining screw 50 may be any standard insert screw. It may be appreciated that the cutting insert is made of, but not limited to, the following materials: ceramic, carbide, cermet and steel.

Figure 5:
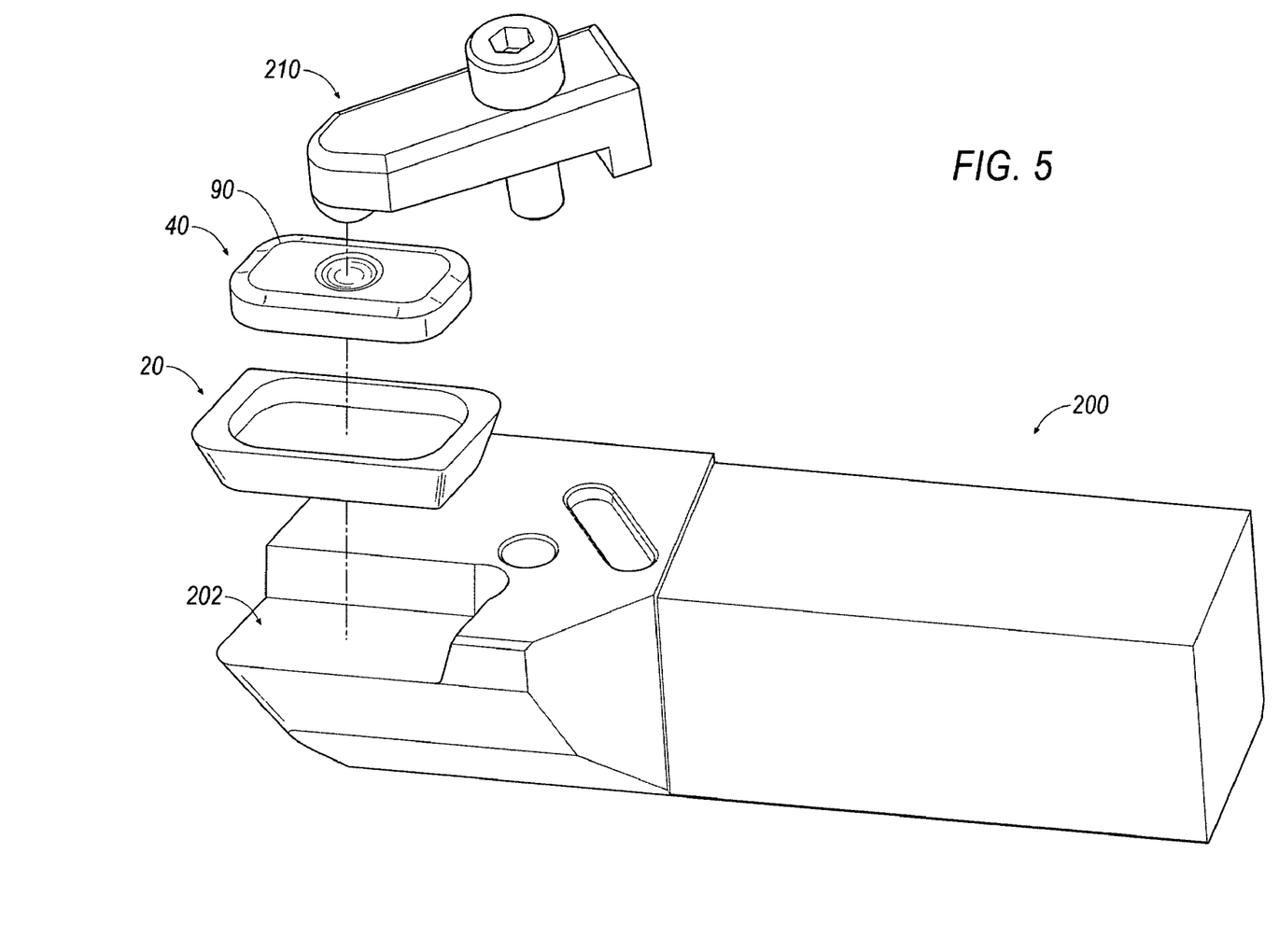
FIG. 5 is an exploded perspective view of an alternative embodiment of the integral insert clamping mechanism.

The milling cutter 100 has a body 104 with a front end 106 and a pocket 102. The pocket 102 has a floor 108, side walls 112 and 113 and a recess 116 positioned rearwardly from the front end 106 of the body 104. The recess 116, also referred to as the apex, is positioned in the area where the side walls 112 and 113, would intersect. The pocket 102 conforms with and provides support to the cutting insert 20. An axial bore 114 with threads 115 is substantially centered on the floor 108 of the pocket 102. A shim (not shown) may position the integral clamping mechanism higher or lower in the pocket 102. It may be appreciated that the milling cutter may be substituted for a tool holder for turning operations, as shown in FIG. 5.

To clamp the insert 20 into the pocket 102 of the milling cutter 100 by the combination screw 50 and clamp plate 40, the screw is inserted into the axial bore 24 of the cutting insert and threadably engaged with mating threads 115 of the milling cutter bore 114. As the screw 50 is threadably engaged with the milling cutter 100, a clamping force is applied by the screw head 52 onto the insert 20 via the clamp plate 40. If the insert 20 were retained to the milling cutter 100 only by the screw 50 and without the clamp plate 40, the clamping force applied by the screw head 52 onto the insert would be localized at the bore 24. The clamping force in addition to other forces caused by metalworking may cause the cutting insert 20 to break near the bore 24. The insert 20 is prone to break near the bore because holes in any material create stress risers around the hole. The purpose of the clamp plate 40 is to disperse the clamping force away from the axial bore 24 and minimize breaking of the insert 20 near the bore.

As shown in FIGS. 3B and 4B, the clamp plate 40 disperses the clamping forces away from the axial bore 24 by transferring the force applied by the screw head 52 to the clamp plate 40 to a protrusion 45 located on bottom surface 42 of the clamp plate. The clamping force is then substantially evenly transferred away from the insert axial bore 24. It may be appreciated that the clamp plate 40 is made of any ferrous or non-ferrous metal or any non-metallic material and the specific gravity of the clamp plate material is less than the specific gravity of the insert material.

FIGS. 3A-3D illustrates a first embodiment of the integral clamping mechanism 10. Two protrusions 45 having a bottom surface 46 extend from the bottom surface 42 of the clamp plate 40. The two protrusions 45 are extensions of two opposite side surfaces 43 of the clamp plate 40. When the clamp plate 40 is seated within the indentation 30, the bottom surfaces 46 of the protrusions 45 are in contact with the bottom surface 32 of the indentation 30 and there is a gap 70 between the bottom surface 42 of the clamp plate and the bottom surface of the indentation. It may be appreciated that the shape of bottom surface 46 of the protrusion 45 in contact with the indentation 30 may be, but not limited to, a flat, a rounded or a pointed shape.

FIGS. 4A-4E illustrates a second embodiment of the integral clamping mechanism 10. A protrusion 45 extends continuously along the periphery of the clamp plate 40. The protrusion 45 is an extension of all the side surfaces 43 of the clamp plate 40 and has a bottom surface 46. The indentation 30 has a channel 35 extending along the periphery of the bottom surface 32 substantially corresponding to the continuous protrusion 45. As the clamp plate 40 is seated within the indentation 30, the protrusion 45 is also seated within the channel 35 to reduce movement of the clamp plate within the indentation during metalworking operations. Similar to the first embodiment of the integral clamping mechanism 10, when the clamp plate 40 is seated within the indentation 30, there is a gap 70 between the bottom surface 42 of the clamp plate and the bottom surface 32 of the indentation 30. It may be appreciated that the shape of bottom surface 46 of the protrusion 45 in contact with the indentation 30 may be, but not limited to, a flat, a rounded or a pointed shape.

The shape of the periphery of the clamp plate 40 is substantially similar to the shape of the periphery of the indentation 30. The substantially similar peripheral shapes allows the clamp plate 40 to be closely fit inside the indentation 30. However, there is a gap 80 between the side surfaces 43 of the clamp plate 40 and the side surfaces 33 of the indentation 30 when the clamp plate 40 is seated within the indentation 30, before the screw 50 is threadably engaged with the milling cutter 100.

In addition to a clamping force applied by the screw head 52 to the insert 20 via the clamp plate 40, the insert is also clamped into the milling cutter pocket 102 towards the apex 116 of the pocket 102 by a lateral clamping force. The lateral clamping force applied by the clamp plate 40 to the insert 20 in the direction of the milling cutter apex 116 is due to an offset (not shown) between the axis of the milling cutter bore 114 and the axis of the combined bore created by the insert bore 24 and the clamp bore 44. The offset of the of the axis of the milling cutter bore is located inward and toward the apex 116 of the milling cutter pocket 102 with respect to the location of the axis of the combined insert bore 24 and the clamp bore 44 when the clamping mechanism 10 is initially placed and aligned in the pocket 102 of the milling cutter 100 before clamping.

The screw shaft 51, when inserted in the clamp plate axial bore 44 and the insert axial bore 24 and threadably engaged with the offset milling cutter bore 114, is forced to be coaxial with the milling cutter bore. The coaxial alignment of the milling cutter bore 114, the screw shaft 51 and the clamp plate bore 44 urges the clamp plate 40 to move in the direction of the milling cutter apex 116, while being seated within the insert indentation 30. The clamp plate side surfaces 43 facing away from the direction of the apex 116 subsequently move away from the indentation side surfaces 33 and the clamp plate side surfaces 43 facing towards the direction of the apex 116 subsequently move towards and come into contact with the indentation side surfaces, as illustrated in FIG. 1. The clamp plate side surfaces 43 in contact with the indentation side surfaces 33 urges the cutting insert 20 in the direction of the apex 116 and subsequently causes the insert side surfaces 23 facing in the direction of the apex 116 to be pressed into contact with the side walls 112 and 113 thereby creating a lateral clamping force.

FIGS. 3B and 4B, show the screw top surface 53, the insert top surface 23 and the clamp plate top surface 43 all being substantially coplanar, when the screw 50 is threadably engaged in the milling cutter 100 and applying a clamping force onto the insert 20. In other words, the top surfaces are all substantially coplanar when the screw head 52 is seated within the chamfer 47 of the clamp plate 40 and the clamp plate 40 is seated within the insert indentation 30. The substantially coplanar top surfaces, in combination, are the rake face of the clamping mechanism 10 during metalworking. The substantially flat rake face is important during metalworking because there is no interference with the evacuation of metal chips. It may be appreciated that the top surface of the clamping mechanism 10 may have non-planar character-istics, such as, but not limited to the side surfaces 23 of the insert 20 extending past the insert top surface 21. It may be appreciated that clamp plate 40 may also have non-planar characteristics. It may be appreciated that the clamp plate top surface 43 may be offset above or below the insert top surface 23.

FIG. 5 shows an alternative embodiment of the integral clamping mechanism 10 attached to a tool holder 200. The cutting insert 20 is seated within the pocket 202 of the tool holder, similarly to being seated within the milling cutter 100. Instead of a clamping force applied by a screw, as shown in FIGS. 1-4E, the clamping force applied to the clamp plate 40 which is seated within the cutting insert 20 is applied by a finger 210. The clamp plate 40 also includes an integral chip breaker 90. The chip breaker 90 is used to cause chips from a work piece to curl and break as the chips slide across the rake face of the cutting insert 20 and the clamp plate. It may be appreciated that the geometry of the chip breaker 90 may be of any geometry known to one skilled in the art for the intended application. In an alternate embodiment the chip breaker may be formed in the rake face of the insert and continue into the clamp face to form a continuous chip breaker. It may also be appreciated that the clamp plate in the embodiments shown in FIGS. 1-4E also includes an integral chip breaker 90.

What has been described is an integral cutting insert clamping mechanism capable of encompassing two embodiments. The present invention may, of course, be carried out in other specific ways other than those herein set forth without departing from the spirit and the essential characteristics of the invention. The present embodiments are therefore to be considered in all respect as illustrative and not restrictive, and all changes coming within the meaning and the equivalency range of the appended claims are intended to be embraced therein.

What is claimed is:

1. An integral cutting insert clamping mechanism comprising:
    a cutting insert comprising a top surface, a bottom surface and a plurality of side surfaces, at least one cutting edge defined at an intersection between the top surface and one of the side surfaces, an axial bore extending between the bottom and top surfaces, the cutting insert further including an indentation in the top surface;
    a clamp plate comprising a top surface, a bottom surface, at least two opposing side surfaces and an axial bore extending between the bottom and top surfaces, the clamp plate seated within the indentation of the cutting insert, the bottom surface of the clamp plate including at least two protrusions, each protrusion extending from the at least two opposing side surfaces, each protrusion having a bottom surface in contact with the indentation of the cutting insert; and
    a retaining screw inserted into the cutting insert bore and the clamp bore,
    wherein the retaining screw engages a tool holder to create a clamping force on the cutting insert and
    wherein each protrusion transfers the clamping force away from the axial bore of the cutting insert.

2. The integral cutting insert clamping mechanism of claim 1, wherein the at least two protrusions extend entirely along the at least two side surfaces of the clamp plate.

3. The integral cutting insert clamping mechanism of claim 1, wherein a shape of the bottom surface of the at least two protrusions in contact with the indentation of the cutting insert is selected from the group consisting of flat, rounded and pointed.

4. The integral cutting insert clamping mechanism of claim 1, wherein the top surface of the clamp plate and the top surface of the cutting insert are substantially coplanar with each other when the retaining screw engages the tool holder.

5. The integral cutting insert clamping mechanism of claim 1, wherein the clamping force is transferred substantially evenly away from the axial bore of the cutting insert.

6. The integral cutting insert clamping mechanism of claim 1, wherein a shape of a periphery of the top surface of the clamp plate substantially corresponds to a shape of a periphery of the indentation.

7. The integral cutting insert clamping mechanism of claim 1, wherein the clamp plate further comprises a chip breaker.

8. An integral cutting insert clamping mechanism comprising:
   a cutting insert comprising a top surface, a bottom surface and a plurality of side surfaces, at least one cutting edge defined at an intersection between the top surface and one of the side surfaces, an axial bore extending between the bottom and top surfaces, the cutting insert further including an indentation in the top surface, the indentation comprising a bottom surface and a plurality of side walls, the indentation including a channel extending along a periphery of the bottom surface;
   a clamp plate having a top surface, a bottom surface and side surfaces, the clamp plate further including a protrusion extending from the side surfaces such that the protrusion extends continuously along a periphery of the clamp plate such that a bottom surface of the protrusion is seated within the channel of the indentation,
   wherein the clamp plate transfers a clamping force away from the axial bore of the cutting insert.

9. An integral cutting insert clamping mechanism comprising:
   a cutting insert including a top surface, a bottom surface and a plurality of side surfaces, at least one cutting edge defined at an intersection between the top surface and one of the side surfaces, an axial bore extending between the top and bottom surfaces, the cutting insert further including an indentation in the top surface; and
   a clamp plate including a top surface, bottom surface, and side surfaces, the clamp plate seated within the indentation of the cutting insert such that the top surface of the cutting insert is substantially coplanar with the top surface of the clamp plate,
   wherein the clamp plate transfers a clamping force away from the axial bore of the cutting insert when the cutting insert is mounted within a pocket of a tool holder, wherein the clamp plate further includes a protrusion extending from at least one of the side surfaces such that a bottom surface of the protrusion contacts the indentation of the cutting insert.

10. The integral cutting insert clamping mechanism of claim 9, further comprising means for mounting the cutting insert within the pocket of the tool holder.

11. An integral cutting insert clamping mechanism comprising:
    a cutting insert including a top surface, a bottom surface and a plurality of side surfaces, at least one cutting edge defined at an intersection between the top surface and one of the side surfaces, the cutting insert further including an indentation in the top surface; and
    a clamp plate including a top surface, bottom surface, and side surfaces, the clamp plate seated within the indentation of the cutting insert, the clamp plate including a protrusion extending from the side surfaces, a portion of the protrusion contacting the indentation of the cutting insert such that a gap exists between the bottom surface of the clamp plate and the indentation of the cutting insert,
    wherein the clamp plate transfers a clamping force away from the axial bore of the cutting insert when the cutting insert is mounted within a pocket of a tool holder.

12. The integral cutting insert clamping mechanism of claim 11, wherein a specific weight of the material of the clamp plate is less than a specific weight of the material of the cutting insert.

* * * * *